United States Patent [19]
Gething

[11] 3,714,764
[45] Feb. 6, 1973

[54] BOILER FLUE GAS SCRUBBER

[75] Inventor: Frank Gething, Milwaukee, Wis.

[73] Assignee: Aqua-Chem, Inc., Milwaukee, Ill.

[22] Filed: Aug. 14, 1970

[21] Appl. No.: 63,685

[52] U.S. Cl. ................................55/235, 261/79 A
[51] Int. Cl. ...............................................B01d 47/10
[58] Field of Search..........55/230, 92, 235; 261/79 A

[56] References Cited

UNITED STATES PATENTS

| | | | |
|---|---|---|---|
| 2,473,672 | 6/1949 | Ziliotto | 261/79 A |
| 3,171,725 | 3/1965 | Eckey | 55/230 X |
| 3,423,294 | 1/1969 | Sephton | 261/79 X |
| 3,495,813 | 2/1970 | Marenghi et al | 55/230 X |

Primary Examiner—Robert L. Lindsay, Jr.
Attorney—Wiviott & Hohenfeldt

[57] ABSTRACT

Pollution control method and apparatus wherein discharge gas containing pollutants is caused to flow between a revolving helical auger-like member and a simultaneously revolving surrounding drum having a film of pollutant absorbing liquid disposed on its surface and caused to flow counter to the gas and into and out of a sump by means of pump vanes carried by the drum.

16 Claims, 4 Drawing Figures

INVENTOR,
FRANK GETHING
By Winnott & Hohenfeldt
Attorney

INVENTOR,

FRANK GETHING

By Winnott & Hohenfeldt
Attorney

BOILER FLUE GAS SCRUBBER

BACKGROUND OF THE INVENTION

This invention relates pollution control means and more particularly to the method and apparatus for the removal of pollutants from gas streams prior to atmospheric discharge.

Pollution of the atmosphere, as well as other elements of the environment, are becoming an ever increasing cause for concern. For example, the burning of fossil fuels in boiler and furnaces generates both particulate pollutants as well as gaseous oxides of nitrogen, sulphur and carbon. In addition, the exhaust from certain processing operations, such as flour mills and cement plants, entrain a substantial concentration of dust particles. These pollutants must be substantially reduced or eliminated from exhausts prior to their discharge into the atmosphere.

It is an object of the invention to provide a new and improved means for removing pollutants from gas streams.

A further object of the invention is to provide a compact, economical and efficient method and apparatus for removing particulate and gaseous pollutants from a gas stream.

A still further object of the invention is to provide means for efficiently removing particulate material from a gas stream without substantially impeding gas flow.

Another object of the invention is to provide new and improved means for removing particulate and gaseous pollutants from boiler or furnace exhaust gases prior to discharge into the atmosphere.

Yet another object of the invention is to provide new and improved means for removing dust particles from process system exhausts.

These and other objects and advantages of the instant invention will become more apparent from the detailed description taken with the accompanying drawings.

SUMMARY OF THE INVENTION

In a method and apparatus for removing pollutants from a gas stream, the combination of, a treating zone, first means rotatably mounted within the treating zone for inducing the flow of gas in a helical path and to cause particles entrained therein to move toward the zonal periphery and second means for inducing the flow of liquid along the zonal periphery.

DESCRIPTION OF THE PREFERRED EMBODIMENTS

Figure 1:
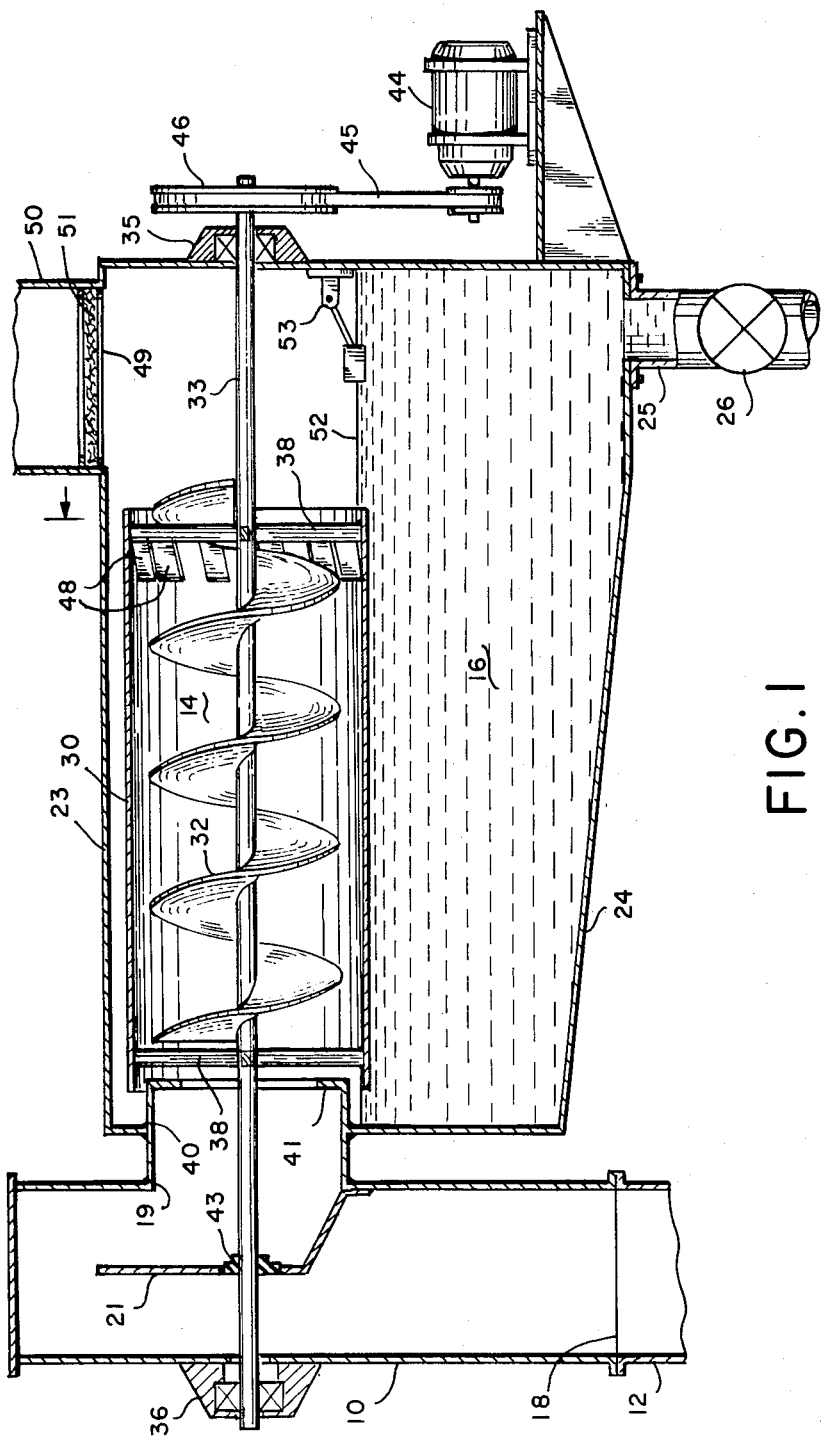
FIG. 1 is a side-elevational view, partly in section, of a pollution control device according to the instant invention.
Figure 2:
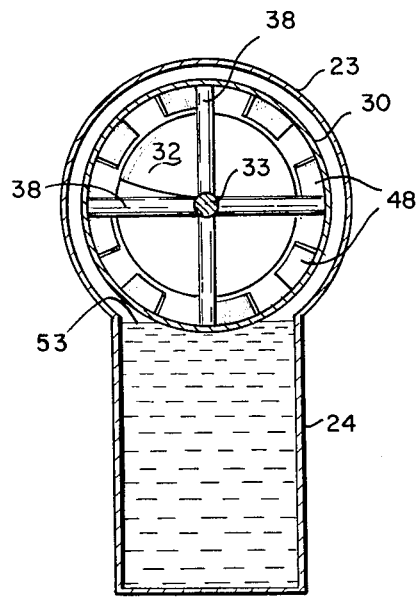
FIG. 2 is a view taken along lines 2—2 of FIG. 1.

The pollution control device according to the preferred embodiment is shown in FIGS. 1 and 2 generally to include a gas inlet duct 10 coupled to the vent stack 12 of a boiler or furnace (not shown), a treating zone 14 coupled to the gas inlet duct and a sump tank 16 coupled to the treating zone 14.

The gas inlet duct 10 is shown in FIG. 1 to be generally elongate and to have an opening 18 in its lower end in communication with the vent stack 12 and a second opening 19 adjacent its other end for communication with the treating zone 14. An inlet duct baffle 21 extends across the inlet duct 10 and from a point immediately below the lower end of the opening 19 and backwardly toward the center of duct 10 and then vertically upwardly to a point above the upper end of opening 19.

The treating zone 14 is disposed within a tank 23 which may be generally cylindrical and extend generally horizontally and away from the gas inlet duct 10 in general registry with the opening 19. A generally rectangular opening may be formed in the lower end of tank 23 for registry with the open upper end of the elongate sump tank 16 which may be generally rectangular in a vertical section taken normal to the plane of drawing. The lower end 24 of the sump tank 16 preferably slopes downwardly and away from the gas inlet duct 10 and toward a drain 25 which may be formed in its lower end and which may be controlled by a valve 26.

The treating zone 14 is defined by a drum 30 and a helical auger-like member 32 each of which are affixed for rotation on a shaft member 33. More specifically, the shaft 33 extends in a coaxial relation through the tank 23 and its opposite ends are journaled for rotation in bearings 35 and 36 respectively mounted on the outer surfaces of the gas inlet duct 10 and the end of the tank 23. The drum 30 is affixed coaxially to the shaft 33 for rotation therewith by means of a plurality of equi-length, radially extending spokes 38 located at each end of the drum 30 and suitably affixed at their inner ends to the shaft 33 and at their outer ends to the inner surface of the drum 30.

The helical member 32 consists of a thin, metallic, helically-shaped web suitably affixed to the shaft 33 and having an outside diameter smaller than the inside diameter of the drum 30 so that a small gap exists therebetween. The relative lengths of the drum 30 and the helical member 32 are determined by the size, type and density of the particles being removed, but in the preferred embodiment of FIG. 1, the axial length of member 32 is substantially the same as that of the drum 30.

A baffle band consisting of a cylindrical member 40 is affixed in a coaxial relation to the opening 19 and extends through the end opening of the tank 23 and into close proximity with the end of the drum 30. The diameter of the baffle band 40 is less than that of the drum 30 and includes an inwardly extending radial flange 41 affixed at its end adjacent to the drum 30. The baffle band 40, the flange 41, and a seal 43 which surround the shaft opening in baffle 21, serve to prevent the passage of water from the treating zone 14 into the vent stack 12 during operation which will be discussed more fully hereinbelow.

The drum 30 and helical member 32 may be rotated at a controlled rate of speed in any suitable manner such as by a motor 44 suitably mounted adjacent the assembly and coupled to the shaft 33 by means of a belt 45 and a spindle 46. The motor 44 will be operated to rotate the helix in the forward direction relative to the direction of helical advancement to assist gas flow through the drum 30 from the opening 19 in the gas inlet duct 10 and through the opposite end of drum 30 which will hereafter be called the down-streamed direction.

A plurality of relatively short rectangular pump vanes 48 are fixed to the down-stream end of the drum 30 and each is disposed obliquely relative to the end thereof so that each pump vane extends generally inwardly in a direction opposite to that in which the drum 30 and helical member 32 rotate. The height of each of the pump vanes 48 may be less than the distance between the inner diameter of the drum 30 and the outer diameter of the helical member 32 so as to avoid engagement therebetween.

The down-stream end of the casing 23 extends beyond the end of the drum 30 and the helical member 32 and opens at its upper end into an exhaust stack 50. A demester element 49 which may, for example, include metallic fibers 51, may extend across the exhaust stack 50 to coalesce water vapor and thereby remove moisture from the exhaust gases and in addition remove any large particles still entrained in the gas stream.

As those skilled in the art will appreciate, the various portions of the assembly just described may be formed of any suitable sheet metal which may be joined in any well known manner.

In operation, water will be disposed in the sump tank 16 to a controlled height which preferably is just above the lower end of the drum 30. Upon actuation, the motor 44 will cause the drum 30 and helical member 32 to rotate at a desired rate of speed. The pump vanes 48 on the down-stream end of the drum 30 will force water to flow into the drum at the down-stream end whereby the centrifugal force imparted by the rotating drum 30 will displace the water as thin film along the inner surface of the drum 30. The action of the pump vanes 48 will cause the water in the drum to move generally in the up-stream direction and discharge back into the sump at the up-stream end of said drum and below the baffle band 40.

The flue gas discharging from the furnace or boiler vent stack 12 passes upwardly through the gas inlet duct 10 and around the baffle 21. The rotating helical member 32 has a pumping action on the exhaust gas to assist the same in its flow from the up-stream to the down-stream of the drum 30. In addition, the helical member forces the gas stream to flow in a helical path which causes particulate matter entrained therein to be thrown onto the water film as a result of inertia as the gas flows through the drum 30. The water and entrained particles are discharged at the up-stream end of the drum 30 whereby the particles collect at the bottom of the tank in the form of sludge which may be periodically removed through the drain 26 as required. The level of water 52 within the tank 16 may be controlled in any manner well known in the art such as by a float control valve 53 which serves to feed water into the tank 16 in accordance with a preset adjustment.

The water within the tank 16 may be treated to react chemically with the various gaseous pollutants which may be present in the gas stream. For example, calcium chloride may be employed to react with nitrous oxide and sulphur dioxides which form calcium sulphate ($CaSO_4 \cdot 2H_2O$) and calcium nitrite ($Ca(NO_3)_2 \cdot 4H_2O$) both of which are soluble in water.

In the preferred embodiment of the invention which is employed with a furnace or boiler, the gas discharging from the stack 12 will normally be at an elevated temperature and pressure. For example, a typical boiler flue gas may have a temperature in the range of 450° F and a discharge velocity in the range of 24 feet per second. The helical member 32 not only allows the discharge gas to traverse the drum 30 without a substantial pressure drop but in fact, the member 32 enhances the gas flow. The pitch and number of turns of the helical member 32 may be varied to accommodate variations in pressure, particle size and density.

Figure 3:
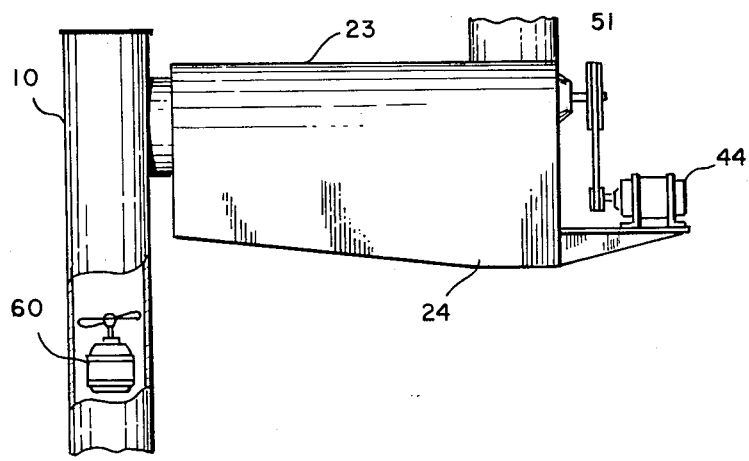
FIG. 3 shows an alternate embodiment of the invention.

FIG. 3 illustrates an alternate embodiment of the instant invention wherein the apparatus is employed in a vent system to remove dust particles prior to the atmospheric discharge. Here a vent fan 60 is shown to be disposed in the vent stack 12 for drawing the air and entrained dust particles into the system whereby the dust particles may be removed in the manner discussed hereinabove. This apparatus will have particular application in installations which generate a substantial amount of dust such as flour and concrete mills.

Figure 4:
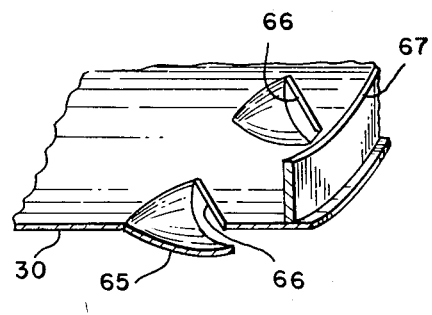
FIG. 4 shows yet another embodiment of the instant invention.

According to another embodiment of the invention shown in FIG. 4, the water projecting means comprises a series of outwardly projecting embossments 65 formed on the drum 30 adjacent its down-stream end. An opening 66 is formed in one end of each embossment and at an angle relative to the drum's longitudinal axis whereby water will be projected onto the inner surface of the drum 65 as it rotates. The embossments permit the use of an inwardly extending flange 67 at the down-stream end of the drum 65 to insure that the water will discharge at the drum's up-stream end.

The apparatus according to the instant invention provides an efficient, compact and economical apparatus for the removal of entrained particles and gaseous contaminants from a discharge gas. The helical member 32 establishes helical gas flow whereby particles may be effectively removed on contact with the water film without substantially impeding gas flow. Further, the counterflow of water relative to the gas stream more effectively assists in removal of entrained particles and the establishment of a thin water film minimizes the evaporation of water from the system.

While only a few embodiments of the invention have been shown and described and while the invention has been discussed in relation to the removal of a relatively few types of particulate material, it is not intended to be limited thereby, but only by the scope of the appended claims.

I claim:

1. An apparatus for removing pollutants from a gas stream, the combination of rotatable drum means having an inner peripheral surface defining a treating zone and having a gas inlet connected to receive said gas stream and a gas outlet for discharging the same, helical means rotatably mounted within said treating zone and between said inlet and said outlet and about an axis generally parallel to the flow of said gas stream in said treating zone, means for rotating said drum means and said helical means, said helical means occupying a substantial area of said treating zone to impede the flow of gas therethrough, the rotation of said helical means inducing the flow of said gas stream outwardly toward said peripheral surface and in a helical path through said treating zone to centrifically move particulate material entrained in said gas stream to said peripheral surface, and second means for introducing a particle entrapping liquid on said first peripheral surface wherebY rotation of said drum centrifically distributes said liquid around said peripheral surface.

2. The apparatus set forth in claim 1 wherein said second means is operative to flow said liquid along said peripheral surface and from the outlet end of said treating zone to the inlet end thereof and in a direction generally counter to that of said gas stream.

3. The apparatus set forth in claim 1 wherein said helical means includes a helical portion which advances in the direction of gas flow.

4. The apparatus set forth in claim 1 wherein said drum means comprises a tubular member mounted for rotation on an axis generally parallel to the direction of gas flow and surrounding said helical means.

5. The apparatus set forth in claim 1 and including means for injecting liquid onto said peripheral surface adjacent the outlet end thereof.

6. The apparatus set forth in claim 3, and including third means external of said treating zone for aiding the flow of gas through said zone and between said inlet and said outlet.

7. The apparatus set forth in claim 3, wherein said drum means comprises a tubular member mounted for rotation on an axis generally parallel to the direction of gas flow and surrounding said helical means, said second means including injecting means for injecting liquid onto the inner surface of said tubular member.

8. The apparatus set forth in claim 7 wherein said injecting means is operative to inject liquid onto said tubular member at the outlet end of said zone so that said liquid forms a thin film on said rotating tubular member and traverses said zone in a direction counter to that of said gas as said tubular member rotates.

9. The apparatus set forth in claim 1, wherein said helical means comprises a helical member having a plurality of volutions which extend generally in the direction of gas flow and said drum means comprises a cylindrical member surrounding said helical member in a generally coaxial relation and having an inside diameter larger than the outside diameter of said helical member, said cylindrical and helical members being rotatable around their common axis.

10. The apparatus set forth in claim 9 and including shaft means extending through said treating zone, said cylindrical and helical members being mounted on said shaft means and means for selectively rotating said shaft means to rotate said first and second members therewith.

11. The apparatus set forth in claim 10, and including a liquid supply and means for injecting liquid onto the inner surface of said cylindrical member as the latter rotates.

12. An apparatus for removing pollutants from a gas stream, the combination of a cylindrical member having an inner peripheral surface defining a treating zone and having a gas inlet connected to receive said gas stream and a gas outlet for discharging the same, a helical member rotatably mounted within said treating zone and between said inlet and said outlet and about an axis generally parallel to the flow of said gas stream in said treating zone, said helical member having a plurality of volutions which extend generally in the direction of gas flow, said cylindrical member surrounding said helical member in a generally coaxial relation and having an inside diameter larger than the outside diameter of said helical member, shaft means extending in a generally horizontal direction through said treating zone, said cylindrical and helical members being mounted on said shaft means, means for selectively rotating said shaft means to rotate said first and second members therewith, tank means disposed below said shaft means, a quantity of liquid disposed in said tank means to the level of said cylindrical member, and projecting means mounted on said cylindrical member for injecting fluid into the inner surface thereof as said cylindrical member rotates.

13. The apparatus set forth in claim 12, wherein said projecting means is disposed on the gas outlet end of said cylindrical member to force said liquid to flow in a direction counter to that of said gas and to discharge from the gas inlet end of said treating zone.

14. The apparatus set forth in claim 13, and including means for controlling the level of liquid in said tank.

15. The apparatus set forth in claim 14, and including a demester means disposed at the outlet end of said treating zone for removing vapor from said treated gas prior to discharge into the atmosphere.

16. The apparatus set forth in claim 15, and including chemical means disposed in said liquid for absorbing pollutant gases from said gas stream.

* * * * *